United States Patent

Hirota et al.

[11] Patent Number: 5,580,325
[45] Date of Patent: Dec. 3, 1996

[54] TOOTH SKIP PREVENTING STRUCTURE OF ENDLESS POWER TRANSMITTING MEANS

[75] Inventors: Takeshi Hirota; Koujiro Kamata; Takayuki Kikuchi; Hiromu Nakamura, all of Wako, Japan

[73] Assignee: Honda Giken Kogyo Kabushiki Kaisha, Tokyo, Japan

[21] Appl. No.: 405,250

[22] Filed: Mar. 17, 1995

[30] Foreign Application Priority Data

Mar. 18, 1994 [JP] Japan .................................. 6-072834

[51] Int. Cl.⁶ ........................................................ F16H 7/18
[52] U.S. Cl. ........................................................ 474/144
[58] Field of Search ........................... 474/140, 144, 474/203–205

[56] References Cited

U.S. PATENT DOCUMENTS

| | | | |
|---|---|---|---|
| 2,292,688 | 8/1942 | Haines et al. | 474/140 X |
| 2,342,091 | 2/1944 | Schroeder | 474/140 X |
| 2,656,150 | 10/1953 | Lock | 474/140 X |
| 2,718,153 | 9/1955 | Dean | 474/140 |
| 3,266,078 | 8/1966 | Brown et al. | 474/140 X |
| 3,885,471 | 5/1975 | Morine et al. | 474/144 |
| 4,422,396 | 12/1983 | Szostak | 474/144 X |

FOREIGN PATENT DOCUMENTS

| | | |
|---|---|---|
| 3328677 | 2/1985 | Germany . |
| 55-161157 | 11/1980 | Japan . |
| 2114260 | 8/1983 | United Kingdom . |

OTHER PUBLICATIONS

Patent Abstract of Japan, vol. 8, No. 270 (M–344) Dec. 1984 of JP–A–59 140954 (Hino Jidosha Kogyo) Aug. 13, 1984.

*Primary Examiner*—Roger J. Schoeppel
*Attorney, Agent, or Firm*—Armstrong, Westerman, Hattori, McLeland & Naughton

[57] ABSTRACT

A structure for preventing a tooth skip in a toothed endless power transmitting belt. On an inner side of a tooth skip preventing member covering an outer surface of a toothed rotor is formed a tooth skip preventing piece bent at a right angle. The tooth skip preventing member is arranged substantially in parallel with the outer circumferential surface of the toothed endless power transmitting belt wound around a toothed driving pulley with a narrower space than a tooth height of the pulley. The tooth skip preventing member is fixed to a casing by a bolt penetrating a hole of the member. On a outer side at a central portion of the tooth skip preventing member is formed a harness holding piece bent at a right angle in the same direction as the tooth skip preventing piece.

17 Claims, 6 Drawing Sheets

TOOTH SKIP PREVENTING STRUCTURE OF ENDLESS POWER TRANSMITTING MEANS

BACKGROUND OF THE INVENTION

1. Field of the Invention

This invention relates to a structure for preventing a tooth skip of an endless power transmitting means.

2. Description of the Related Art

A tooth skip preventing device for a toothed endless power transmitting belt is disclosed in a gazette of Japanese Utility Model Laid-open No. Sho 55-161157.

In the tooth skip preventing device for the toothed endless power transmitting belt disclosed in the aforesaid gazette, the tooth skip preventing member for restricting the toothed endless power transmitting belt wound around the pulley from being moved toward a radial direction of the pulley was merely and directly fixed to the main body of an internal combustion engine at the main body side of a power transmitting device, and the tooth skip preventing member had no function other than the above.

In addition, the tooth skip preventing piece of the tooth skip preventing member was arranged in parallel with a rotating axis of the pulley from its abutting edge against the main body of an internal combustion engine up to its outer free edge, and a fixing piece bent at a right angle from the inner end edge of the tooth skip preventing piece was abutted and fixed to the main body of the internal combustion engine, resulting in that a rotational angle sensing rotary member having a larger diameter than that of the pulley could not be arranged between the pulley and the main body of the internal combustion engine.

SUMMARY OF THE INVENTION

This invention relates to an improvement in a tooth skip preventing structure of an endless power transmitting means overcoming such problems described as above and provides a tooth skip preventing structure of an endless power transmitting belt wound around a toothed driving rotary member and a toothed driven rotary member, characterized in that a tooth skip preventing piece of a tooth skip preventing member is arranged along an outer circumferential surface of said endless power transmitting means wound around said rotary member with a narrower space than a tooth height of said rotary member from said outer circumferential surface and a back surface of the tooth skip preventing piece of said tooth skip preventing member-is applied as a supporting surface of a linear member.

Since the present invention is constructed as described above, even if the endless power transmitting means wound around the toothed rotary member tends to ride over the teeth of the toothed rotary member under a high tension or vibration or the like, the back surface of the endless power transmitting means is abutted against the tooth skip preventing piece of the tooth skip preventing member so as to prevent a tooth skip of the power transmitting means in advance.

In addition, since the back surface of the tooth skip preventing piece of the tooth skip preventing member in the present invention is applied as a supporting member for the linear member, the linear member can be stably supported at the tooth skip preventing member. The linear member may be held by the tooth skip preventing member and a power transmitting means cover, thereby the linear member can be more positively supported.

In an aspect of the present invention, a rotor acting as a detected object having a larger diameter than that of the toothed rotary member is arranged at a pivoted base part of the toothed rotary member adjacent to a rotational angle sensing sensor, and the tooth skip preventing member is arranged adjacent to the rotor so as to cover an outer surface of the rotor.

According to the present invention, adhesion of foreign material to the rotor can be reduced as much as possible and an accuracy in detecting of a rotational angle can be improved.

In another aspect of the present invention, the rotor, the toothed rotary member, the endless power transmitting means and the tooth skip preventing member are arranged within a power transmitting means cover member provided with a water drain hole below the toothed rotary member and the rotor, and the tooth skip preventing member covering an outer surface of the rotor is arranged adjacent to the water drain hole.

According to the present invention, foreign materials can be prevented from being adhered to the rotor acting as the detected member or the rotational angle detecting sensor and further moisture content entered or condensed within a space enclosed by the main body of the power transmitting device and the power transmitting means cover can be discharged out of the device.

The present invention provides also a tooth skip preventing structure of an endless power transmitting means wound around a toothed driving rotary member and a toothed driven rotary member, characterized in that a tooth skip preventing piece of a tooth skip preventing member is arranged along an outer circumferential surface of said endless power transmitting means wound around said rotary member with a narrower space than a tooth height of said rotary member from said outer circumferential surface, and said tooth skip preventing piece of said tooth skip preventing member is inclined so that a space between said piece and the outer circumferential surface of said endless power transmitting means wound around said rotary member is increased in a direction going away from the pivoted base side surface of said toothed rotary member.

According to the invention, a space between an outer edge of the tooth skip preventing piece of the tooth skip preventing member (an edge spaced apart from the main body of the power transmitting device) and the outer circumferential surface of the pulley is made wider, so that a replacing work for the endless power transmitting means can be easily carried out without removing the tooth skip preventing member from the main body of tha power transmitting apparatus.

DETAILED DESCRIPTION OF THE PREFERRED EMBODIMENTS

Figure 1:
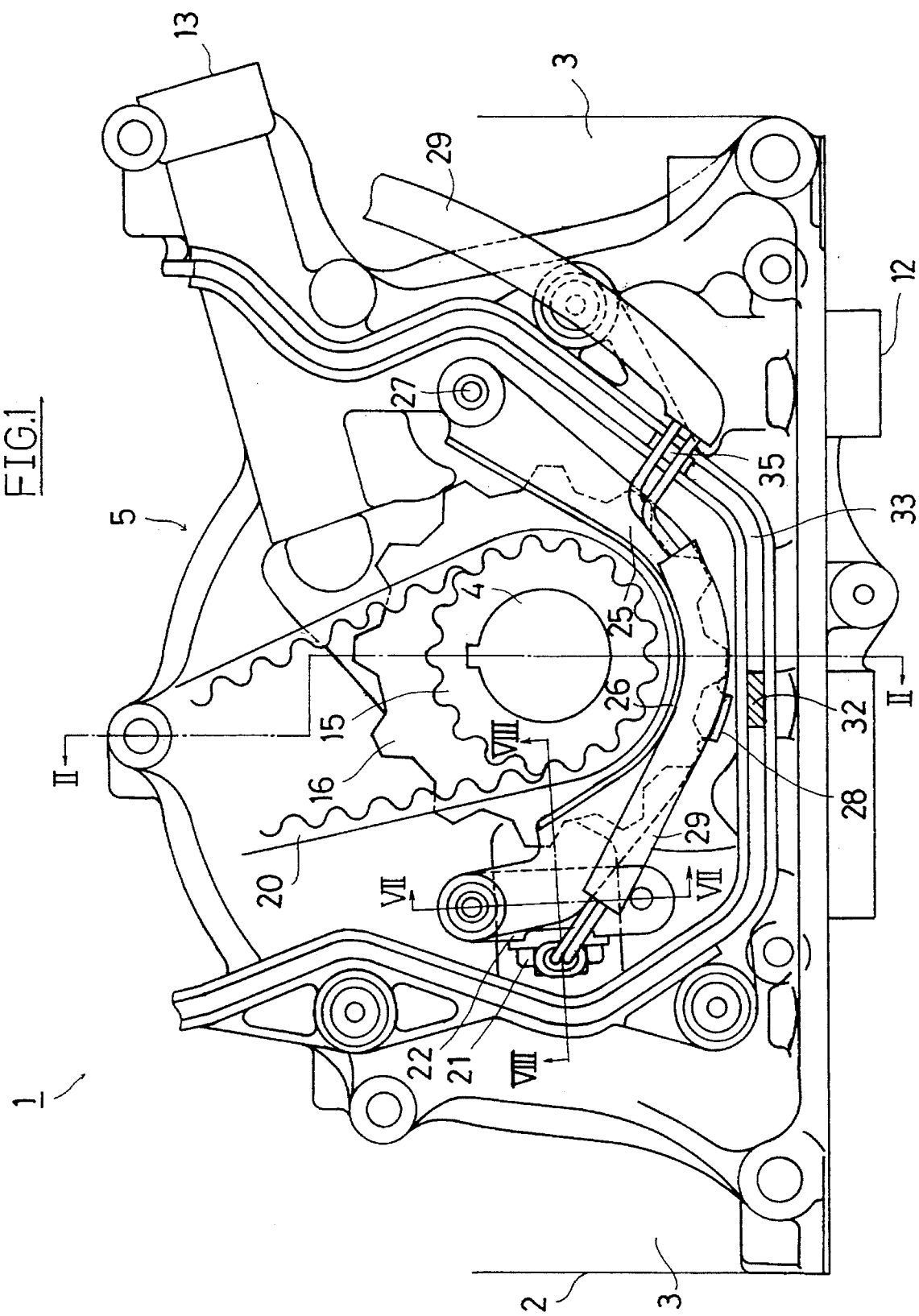
FIG. 1 is a front elevational view showing a state in which a timing belt cover is removed in one preferred embodiment of the endless power transmitting means.
Figure 2:
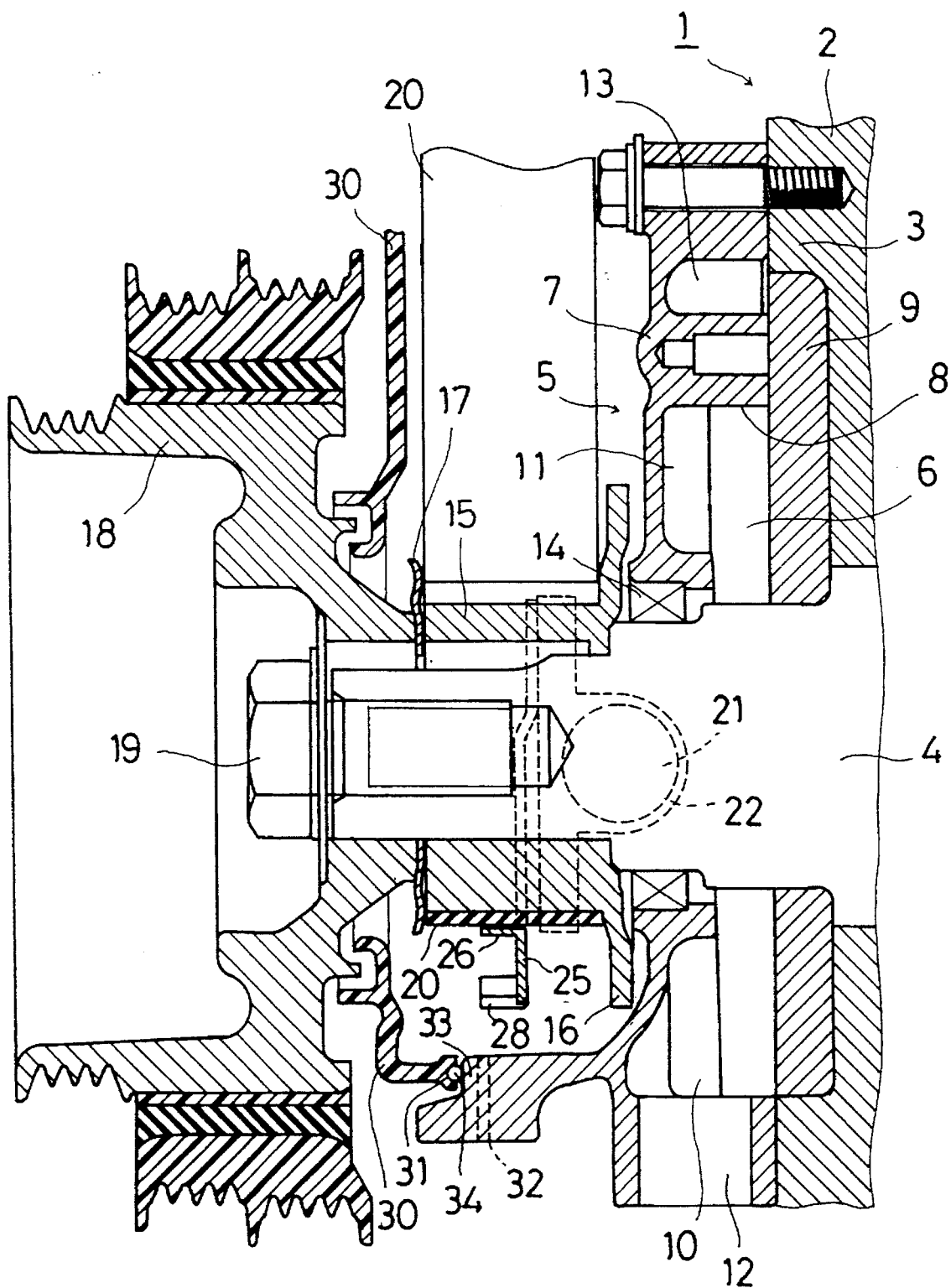
FIG. 2 is a longitudinal side elevational view in section taken along a line II—II in FIG. 1 of a state in which an auxiliary machine driving pulley and a timing belt cover are installed.
Figure 3:
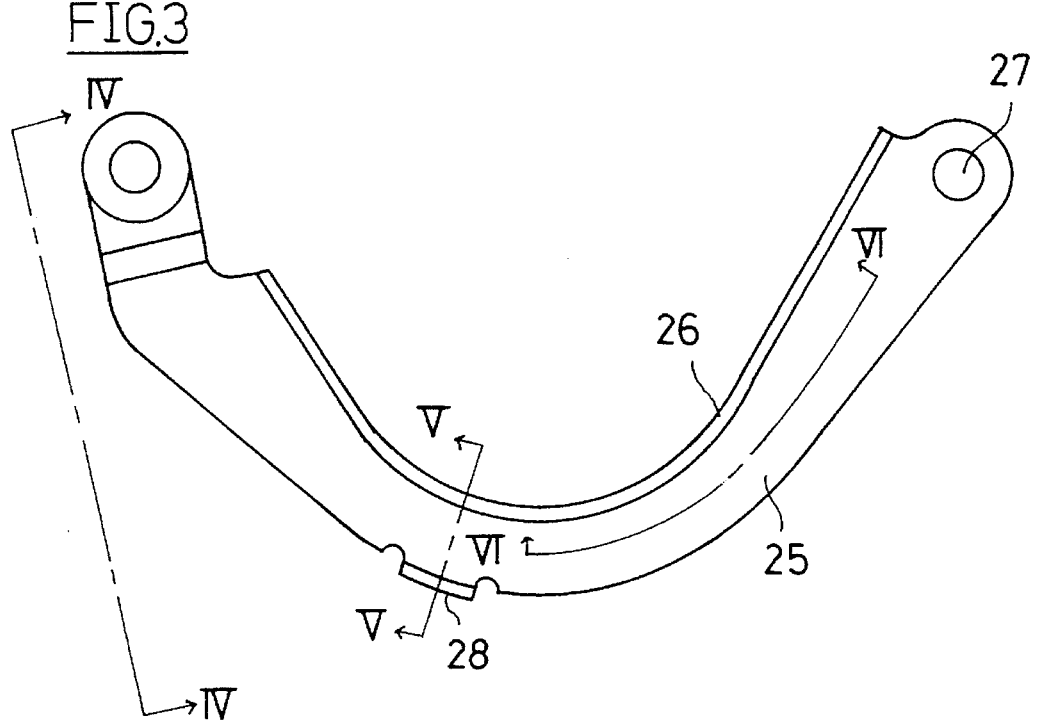
FIG. 3 is a front elevational view for showing a tooth skip preventing member in the preferred embodiment shown in FIG. 1.
Figure 4:
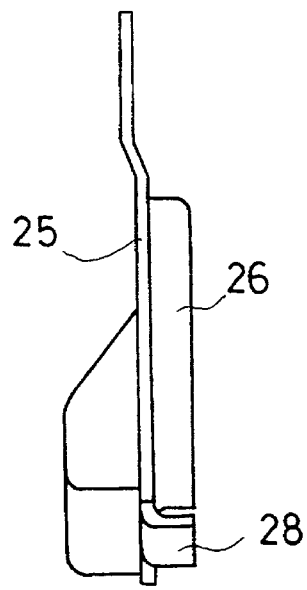
FIG. 4 is a view taken along an arrow line IV—IV of FIG. 3.
Figure 5:
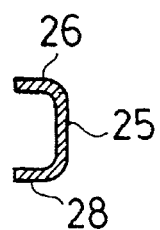
FIG. 5 is a cross sectional view taken along a line V—V of FIG. 3.
Figure 6:
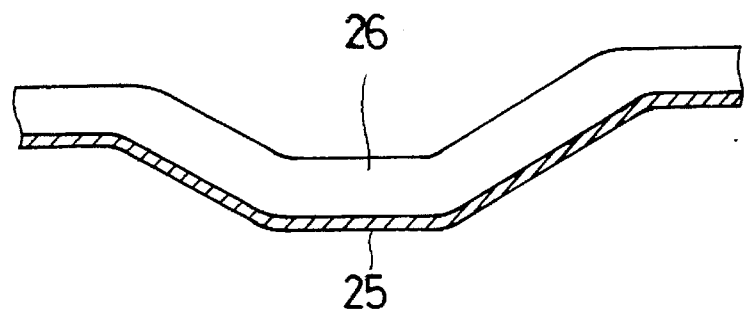
FIG. 6 is a longitudinal section taken along a line VI—VI of FIG. 3.
Figure 7:
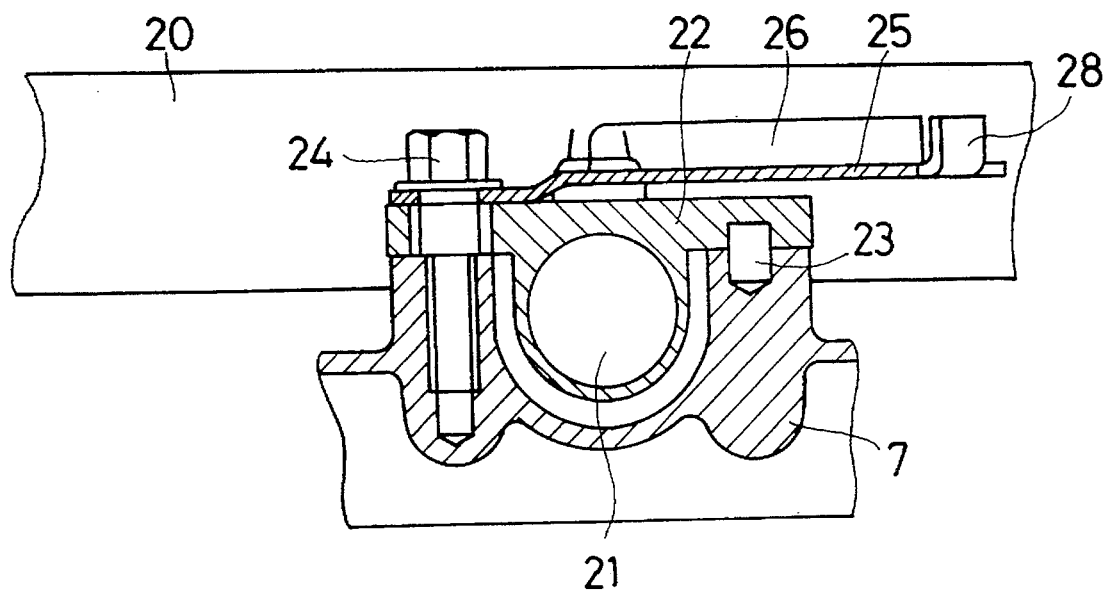
FIG. 7 is a longitudinal section taken along a line VII—VII of FIG. 1.
Figure 8:
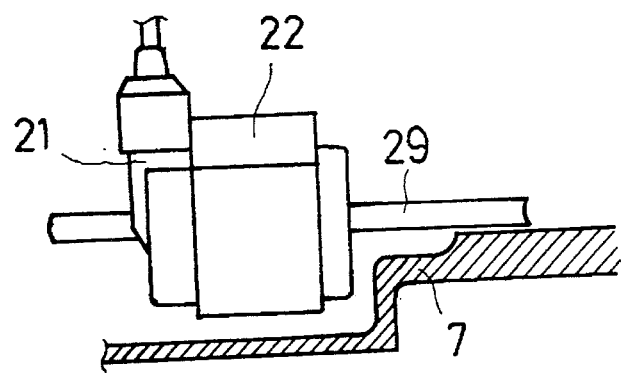
FIG. 8 is a cross sectional view taken along VIII—VIII of FIG. 1.

Referring now to FIGS. 1 to 8, a preferred exemplary embodiment of the present invention applied to the internal combustion engine will be described as follows.

A four-cycle internal combustion engine 1 of an over-head cam type is installed on a vehicle (not illustrated) with its crankshaft 4 being directed in a width of the vehicle. The crankshaft 4 passes through a side wall 3 of a cylinder block 2 and projects from it. A rotor 6 of an oil pump 5 is fitted to a projecting base portion of the crank shaft 4. When the crankshaft 4 is rotated, the rotor 6 of the oil pump 5 is also rotationally driven integrally with the crankshaft 4.

In addition, the rotor 6 of the oil pump 5 is rotatably fitted within a rotor chamber 8 of the casing 7, sealingly closed by a lid 9. Both a suction port 10 and a discharging port 11 communicating with the rotor chamber 8 are formed in the casing 7 and each of the suction port 10 and the discharging port 11 is communicated with a suction passage 12 and a discharging passage 13, respectively. An oil seal 14 is provided between the crankshaft 4 and the casing 7.

A toothed driving pulley 15 for driving a valve moving mechanism, a belt position restricting guide plate 17 and an auxiliary machine driving pulley 18 are fitted with keys in sequence to the extreme end of the crankshaft 4 projected from the casing 7 of the oil pump 5. The toothed driving pulley 15 and the auxiliary machine driving pulley 18 are integrally fitted to the crankshaft 4 with bolt 19 threadably fitted to a threaded hole at the end surface of the crankshaft 4. A toothed endless timing belt 20 acting as a toothed endless power transmitting means is wound around the toothed driving pulley 15 and a toothed driven pulley (not shown) at the upper part of the 4-cycle internal combustion engine 1, wherein a rotational force of the crankshaft 4 is transmitted to the toothed driven pulley through a toothed driving pulley 15 and the toothed endless timing belt 20 and then a valve moving cam (not shown), which is integral with the toothed driven pulley, rotationally driven.

A toothed rotor 16 acting to restrict a position of the belt and to detect a rotational angle of the crankshaft 4 is concentrically and integrally formed at the toothed driving pulley 15. The toothed driving pulley 15 and the toothed rotor 16 are formed of ferromagnetic material such as steel.

A rotational angle sensor 21 is arranged adjacent to the toothed rotor 16.

The rotational angle sensor 21 is integrally fitted to a sensor holder 22 of synthetic resin. A lower base end (a right end in FIG. 7) of the sensor holder 22 is connected to the casing 7 of the oil pump 5 through a pin 23 and at the same time the upper base end (a left end in FIG. 7) of the sensor holder 22 is integrally connected to the casing 7 by a bolt 24 which passes through one end (a left end in FIG. 1) of a tooth skip preventing member 25 and the upper base end of the sensor holder 22 and is threadably fitted to the casing 7. A pulse is transmitted from the rotational angle sensor 21 in response to a variation in magnetic flux generated every time the teeth of the toothed rotor 16 pass near the rotational angle sensor 21.

The tooth skip preventing member 25 covers the outer surface of the toothed rotor 16. A tooth skip preventing piece 26 is formed inside the tooth skip preventing member 25 and is bent at a right angle from the member 25. The tooth skip preventing piece 26 is arranged to be positioned substantially parallel to an outer circumferential surface of the endless timing belt 20 wound around the toothed driving pulley 15 with a narrower space than a tooth height of the toothed driving pulley 15 between the piece 26 and the outer circumferential surface. The tooth skip preventing member 25 is integrally fixed to the casing 7 by a bolt (not shown) which passes through a threaded hole 27 at the other end of the tooth skip preventing member 25 to be screwed to the casing 7.

In addition, a harness holding piece 28 bent substantially at a right angle in the same direction as that of the tooth skip preventing piece 26 is formed outside the substantial central part of the tooth skip preventing member 25. A harness 29 for transmitting a detecting pulse from the rotational angle sensor 21 is placed along the tooth skip preventing member 25 and at the same time it is held between the tooth skip preventing piece 26 and the harness holding piece 28.

The casing 7 of the oil pump 5 is formed with a cover abutting part 33 against which a peripheral edge 31 of a timing cover 30 covering the space around the toothed endless timing belt 20 is abutted through an O-ring 34. A part of the casing 7 adjoining to the peripheral edge 31 is provided with a water drain hole 32 (a location of hatching in FIG. 1 and this may not be a hole, but a recess). The timing belt cover 30 is removably attached to the cover abutting part 33 of the casing 7 by means of a bolt (not shown).

The peripheral edge 31 of the timing belt cover 30 and the cover abutting part 33 of the casing 7 are formed with recesses 35 at the location where the harness 29 traverses.

Since the preferred embodiment shown in FIGS. 1 to 8 is constructed as described above, as the crankshaft 4 is rotated, the valve moving cam is rotationally driven through the toothed driving pulley 15, the toothed endless timing belt 20 and the toothed driven pulley (not shown). A suction valve and a discharging valve (not shown) are opened or closed at a predetermined timing and at the same time a pulse is transmitted from the rotational angle sensor 21 in response to a rotational angle of the crankshaft 4.

Even if a high tension OF vibration is applied to the toothed endless timing belt 20, resulting in a tendency for the tooth of the toothed endless timing belt 20 to ride over the tooth of the toothed driving pulley 15, the outer surface of the toothed endless timing belt 20 is abutted against tooth skip preventing piece 26 of the tooth skip preventing member 25 arranged outside it, thereby preventing a tooth skip.

In addition, the harness 29 connected to the rotational angle sensor 21 is abutted against the main body of the tooth skip preventing member 25 and the tooth skip preventing piece 26 and at the same time the harness 29 is held by the harness holding piece 28 and the tooth skip preventing piece 26, so that the harness 29 is stably held.

Since both ends of the tooth skip preventing member 25 are integrally fixed to the casing 7 of the oil pump 5 at locations spaced apart in a radial direction from the outer circumference of the toothed rotor 16, it is possible to arrange the tooth skip preventing piece 26 of the tooth skip preventing member 25 adjacent to the toothed driving pulley 15 without being hindered by the toothed rotor 16 having a larger diameter than that of the toothed driving pulley 15 and at the same time the outside part of the toothed rotor 16 is covered by the tooth skip preventing member 25 so as to enable some foreign materials to be prevented from being adhered to the toothed rotor 16 and then an accuracy in detecting a rotational angle can be improved.

Since a space near the toothed endless timing belt 20 is covered by the casing 7 of the oil pump 5 and the timing belt cover 30, it is possible to prevent some foreign materials or the like from entering the device.

Since the bottom part of the timing belt cover 30 is provided with the water drain hole 32, water or the like condensed at a space enclosed by the casing 7 and the timing belt cover 30 can be positively discharged out through the water drain hole 32.

Since the main body of the tooth skip preventing member 25 is arranged at the toothed rotor 16 rather than at the water drain hole 32, even if foreign materials enter from the water drain hole 32 into the timing belt cover 30, adhesion of the foreign materials to the toothed rotor 16 can be prevented as much as possible.

The toothed rotor 16 may act as one for restricting the belt position and is integrally formed with the toothed driving pulley 15, so that the number of component parts is less, the device is compactly constructed and then both light weight and low cost of the device can be attained.

Figure 9:
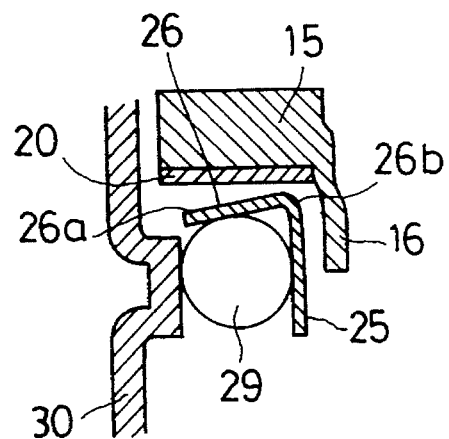
FIG. 9 is a cross sectional view for showing a part similar to FIG. 8 of another preferred embodiment.

Although the preferred embodiment shown in FIGS. 1 to 8 is constructed such that the tooth skip preventing piece 26 of the tooth skip preventing member 25 is bent substantially at a right angle in respect to the main body of the tooth skip preventing member 25, the tooth skip preventing piece 26 may be bent over 90° in respect to the main body of the tooth skip preventing member 25, as shown in FIG. 9, in this embodiment, the tooth skip preventing piece 26 is inclined so as to approach the toothed endless timing belt 20 from the outer edge 26a of the tooth skip preventing piece 26 toward the bent edge 26b, thereby a space between the toothed driving pulley 15 and the tooth skip preventing piece 26 of the tooth skip preventing member 25 is widened toward the outside, resulting in that the toothed endless timing belt 20 can be easily attached or detached.

In addition, as shown in FIG. 9, in the case that the main body of the tooth skip preventing member 25 is arranged to cover the outer side surface of the rotor 16, an effect of preventing foreign materials from being adhered to the rotor 16 can be improved.

The harness holding piece 28 may also eliminated and the harness 29 is held by the timing belt cover 30 and the main body of the tooth skip preventing member 25. In such a preferred embodiment, it is possible to make a positive prevention of floating of the harness toward the timing belt cover 30 and, further, if the harness holding piece 28 is also applied, a supporting force of the harness 29 can be improved.

Figure 10:
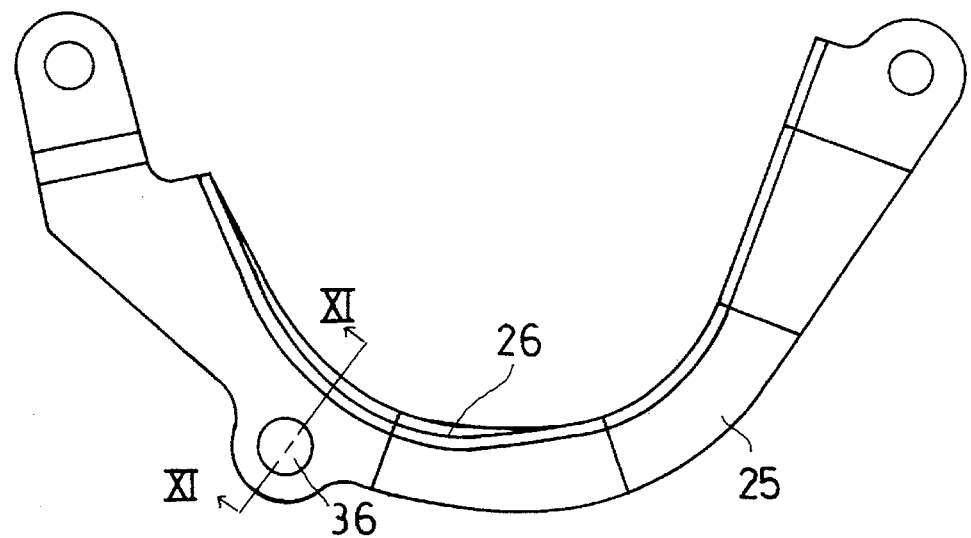
FIG. 10 is a front elevational view for showing a tooth skip preventing member of a still further preferred embodiment.
Figure 11:
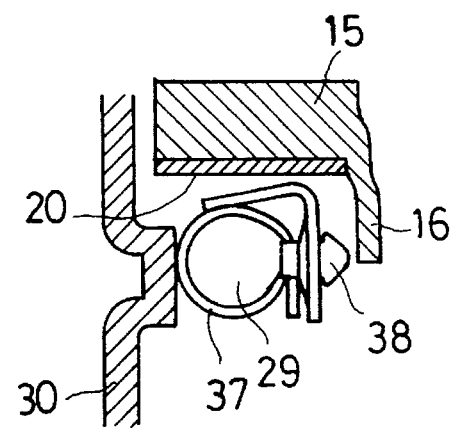
FIG. 11 is a cross sectional view taken along a line XI—XI of FIG. 10.

In another embodiment shown in FIGS. 10 and 11, a base part 38 of a fixing band 37 is fitted to a fixing hole 36 formed in the tooth skip preventing member 25. The fixing band 37 is wound around the harness 29, and the extreme end of the fixing band 37 is inserted into a hole (not shown) formed in the base part 38 of the fixing band 37, thereby the harness 29 may be fixed to the tooth skip preventing member 25. Also in this embodiment, the harness 29 can be positively held at the tooth skip preventing member 25.

Figure 12:
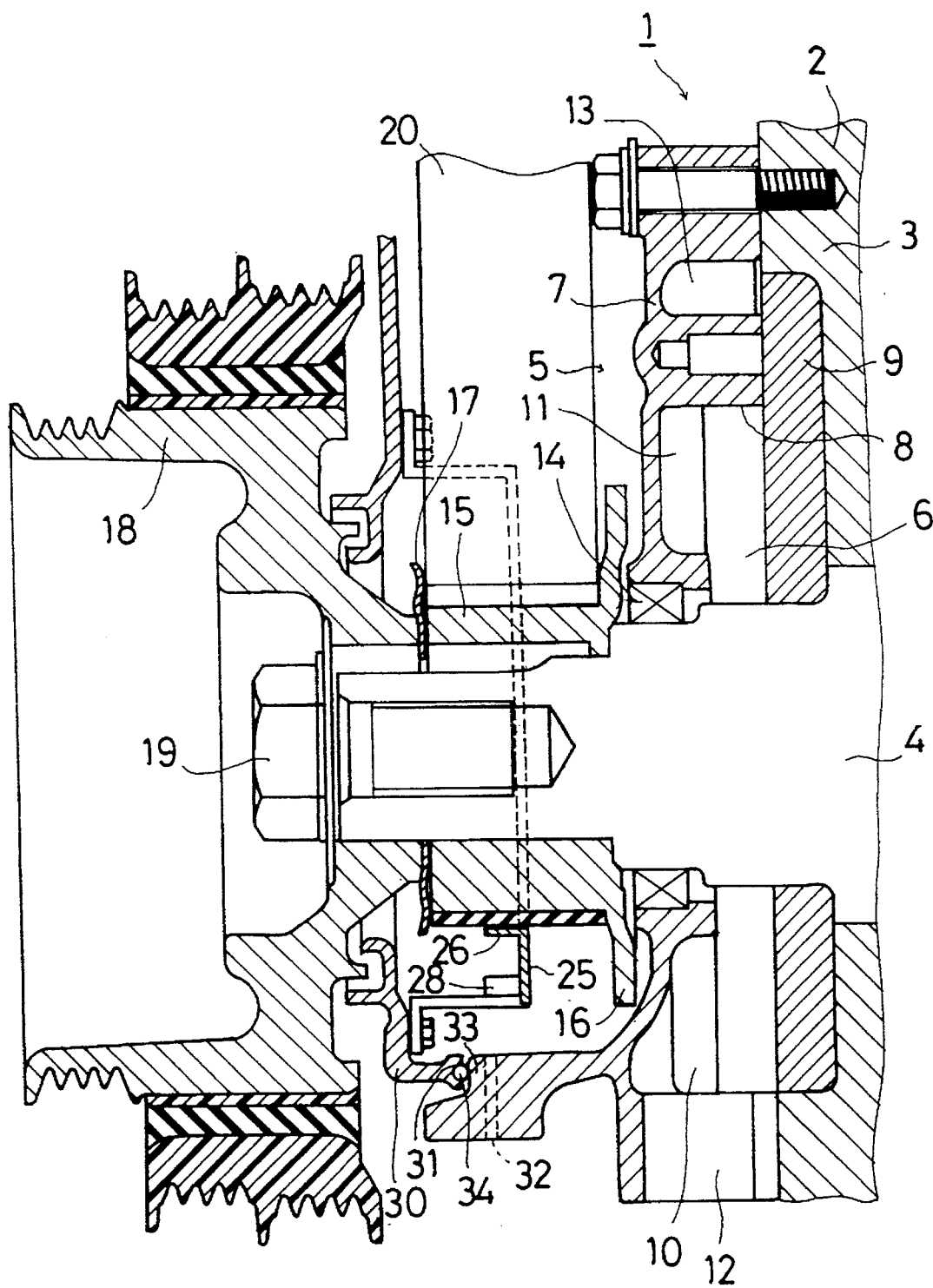
FIG. 12 is a longitudinal section for showing a substantial part of a still further preferred embodiment of the present invention.

Although in the preferred embodiment shown in FIGS. 1 to 8, both ends of the tooth skip preventing member 25 are integrally fixed to the casing 7 of the oil pump 5, as shown in FIG. 12, both ends of the tooth skip preventing member 25 may be integrally fixed to the metallic timing belt cover 30 with bolt and the like.

In the aforesaid preferred embodiments, the present invention is applied to the toothed timing belt power transmitting device and it is also apparent that the present invention can be applied to a chain power transmitting device.

What is claimed is:

1. A tooth skip preventing structure of an endless power transmitting means wound around a toothed rotary member, comprising:

a tooth skip preventing piece of a tooth skip preventing member arranged along an outer circumferential surface of said endless power transmitting means wound around said toothed rotary member, a space between said outer circumferential surface of said endless power transmitting means and said tooth skip preventing piece being less than a tooth height of said toothed rotary member, and a back surface of said tooth skip preventing piece of said tooth skip preventing member supporting a linear member, wherein a rotor acting as a detected object having a diameter greater than that of said toothed rotary member is arranged at a pivoted base part of said toothed rotary member adjacent to a rotational angle detecting sensor, and said tooth skip preventing member is arranged adjacent said rotor so as to cover an outer surface of said rotor.

2. A tooth skip preventing structure of an endless power transmitting means according to claim 1, wherein said rotor, said toothed rotary member, said endless power transmitting means and said tooth skip preventing member are arranged within a power transmitting means cover member provided with a water drain hole below said toothed rotary member and said rotor, and the tooth skip preventing member covering an outer surface of said rotor is arranged adjacent said water drain hole.

3. A tooth skip preventing structure of an endless power transmitting means according to claim 2, wherein a main body of said tooth skip preventing member is disposed on the side of said rotor with respect to said water drain hole.

4. A tooth skip preventing structure of an endless power transmitting means wound around a toothed rotary member, comprising:

a tooth skip preventing piece of a tooth skip preventing member arranged along an outer circumferential surface of said endless power transmitting means wound around said toothed rotary member, a space between said outer circumferential surface of said endless power transmitting means and said tooth skip preventing piece being less than a tooth height of said toothed rotary member, and a back surface of said tooth skip preventing piece of said tooth skip preventing member supporting a linear member, wherein a rotor acting as a detected object having a diameter greater than that of said toothed rotary member is arranged at a pivoted base part of said toothed rotary member adjacent to a rotational angle detecting sensor, and said rotational angle detecting sensor is fixed to a casing of an oil pump.

5. A tooth skip preventing structure of an endless power transmitting means according to claim 4 wherein said rotational angle detecting sensor is integrally fitted to a sensor holder of synthetic resin, and both said sensor holder and said tooth skip preventing member are fastened to said casing of the oil pump by a common fastening means.

6. A tooth skip preventing structure of an endless power transmitting means wound around a toothed rotary member, comprising:

a tooth skip preventing piece of a tooth skip preventing member arranged along an outer circumferential surface of said endless power transmitting means wound around said toothed rotary member, a space between said outer circumferential surface of said endless power transmitting means and said tooth skip preventing piece being less than a tooth height of said toothed rotary member, and a back surface of said tooth skip preventing piece of said tooth skip preventing member supporting a linear member, wherein said linear member is a harness connected to a rotational angle detecting sensor.

7. A tooth skip preventing structure of an endless power transmitting means according to claim 6, wherein said harness is held between said tooth skip preventing piece of the tooth skip preventing member and harness holding piece formed on said tooth skip preventing member opposite said tooth skip preventing piece.

8. A tooth skip preventing structure of an endless power transmitting means wound around a toothed rotary member, comprising:

a tooth skip preventing piece of a tooth skip preventing member arranged along an outer circumferential surface of said endless power transmitting means wound around said toothed rotary member, a space between said outer circumferential surface of said endless power transmitting means and said tooth skip preventing piece being less than a tooth height of said toothed rotary member; and a rotor acting as a detected object having a larger diameter than that of said toothed rotary member arranged at a pivoted base part of said toothed rotary member adjacent a rotational angle detecting sensor, said tooth skip preventing member being arranged adjacent said rotor so as to cover an outer surface of said rotor.

9. A tooth skip preventing structure of an endless power transmitting means according to claim 4, wherein said rotor, said toothed rotary member, said endless power transmitting means and said tooth skip preventing member are arranged within a power transmitting means cover member provided with a water drain hole below said toothed rotary member and said rotor, and the tooth skip preventing member covering an outer surface of said rotor is arranged adjacent said water drain hole.

10. A tooth skip preventing structure of an endless power transmitting means according to claim 9, wherein a main body of said tooth skip preventing member is disposed on the side of said rotor with respect to said water drain hole.

11. A tooth skip preventing structure of an endless power transmitting means according to claim 8, wherein said tooth skip preventing piece of said tooth skip preventing member is inclined so that a space between said piece and the outer circumferential surface of said toothed rotary member is increased in a direction going away from the pivoted base side surface of said toothed rotary member.

12. A tooth skip preventing structure of an endless power transmitting means according to claim 8, wherein a linear member is held by said toothed skip preventing member and a power transmitting means cover.

13. A tooth skip preventing structure of an endless power transmitting means according to claim 8, wherein said rotational angle detecting sensor is fixed to a casing of an oil pump.

14. A tooth skip preventing structure of an endless power transmitting means according to claim 13, wherein said rotational angle detecting sensor is integrally fitted to a sensor holder of synthetic resin.

15. A tooth skip preventing structure of an endless power transmitting means according to claim 13, wherein said rotational angle detecting sensor is integrally fitted to a sensor holder of synthetic resin, and both said sensor holder and said tooth skip preventing member are fastened to said casing of the oil pump by a common fastening means.

16. A tooth skip preventing structure of an endless power transmitting means wound around a toothed rotary member, comprising:

a tooth skip preventing piece of a tooth skip preventing member is arranged along an outer circumferential surface of said endless power transmitting means wound around said toothed rotary member, a space between said outer circumferential surface of said endless power transmitting means and said tooth skip preventing piece being less than a tooth height of said toothed rotary member, said tooth skip preventing piece of said tooth skip preventing member being inclined so that a space between said tooth skip preventing piece and the outer circumferential surface of said endless power transmitting means wound around said toothed driving rotary member increases in a direction going away from a pivoted base side surface of said toothed rotary member.

17. A tooth skip preventing structure of an endless power transmitting means according to claim 16, wherein a linear member is held by said toothed skip preventing member and a power transmitting means cover.

* * * * *